US010310288B1

(12) United States Patent
D'Amico et al.

(10) Patent No.: US 10,310,288 B1
(45) Date of Patent: Jun. 4, 2019

(54) DISPLAY ALIGNMENT USING DIFFRACTION

(71) Applicant: Facebook Technologies, LLC, Menlo Park, CA (US)

(72) Inventors: Samuel Redmond D'Amico, Irvine, CA (US); Evan M. Richards, Santa Clara, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 380 days.

(21) Appl. No.: 15/279,161

(22) Filed: Sep. 28, 2016

(51) Int. Cl.
| G02B 27/42 | (2006.01) |
| G02B 27/01 | (2006.01) |
| G06T 7/00 | (2017.01) |
| G09G 5/38 | (2006.01) |
| G09G 3/3208 | (2016.01) |

(52) U.S. Cl.
CPC ....... G02B 27/4255 (2013.01); G02B 27/017 (2013.01); G02B 27/0179 (2013.01); G06T 7/004 (2013.01); G09G 3/3208 (2013.01); G09G 5/38 (2013.01); *G06T 2207/10152* (2013.01)

(58) Field of Classification Search
CPC .............. G02B 27/017; G02B 27/0172; G02B 27/0179; G02B 27/0198; G02B 27/4255; G02B 2027/0174
See application file for complete search history.

(56) References Cited

U.S. PATENT DOCUMENTS

| 4,265,542 A * | 5/1981 | Snow ................. G02B 27/4255 356/400 |
| 5,341,213 A * | 8/1994 | Giroux .................. G02B 27/46 348/E5.027 |
| 6,124,954 A * | 9/2000 | Popovich ............. G02B 27/017 345/8 |
| 2015/0205351 A1* | 7/2015 | Osterhout ............... G06F 3/012 345/156 |
| 2015/0260994 A1* | 9/2015 | Akutsu ..................... G02B 6/34 359/567 |
| 2015/0362734 A1* | 12/2015 | Moser .................. G03H 1/0248 1/248 |
| 2016/0202485 A1* | 7/2016 | Yamada ................. G02B 26/10 345/8 |
| 2016/0320620 A1* | 11/2016 | Maimone ................ G06F 3/011 |
| 2017/0169747 A1* | 6/2017 | Richards ................ G09G 3/006 |

OTHER PUBLICATIONS

Song et al., "Design and assessment of a wide FOV and highresolution optical tiled head-mounted display", Applied Optics, vol. 54, issue 28, pp. E15-E22 (2015).*

* cited by examiner

*Primary Examiner* — Eric L Bolda

(74) *Attorney, Agent, or Firm* — Fenwick & West LLP

(57) ABSTRACT

In systems and methods for adjusting the position of a headset element (e.g., a display and/or other optical element), coherent light (e.g., a laser beam) is transmitted through a display of a headset to produce a diffraction pattern on a detector, which detects the diffraction pattern. The orientation of the headset element is determined based in part on the detected diffraction pattern. Based on the determined orientation and a target orientation, an adjustment to the orientation of the headset element is determined. The position of the headset element is adjusted based on the determined adjustment. This method may be repeated until the headset element is determined to be correctly oriented.

20 Claims, 8 Drawing Sheets

DISPLAY ALIGNMENT USING DIFFRACTION

BACKGROUND

The present disclosure generally relates to head-mounted displays, and specifically relates to active alignment of elements within a head-mounted display.

A head-mounted display (HMD) may be part of a virtual, augmented, or mixed reality system. The HMD typically provides multiple forms of sensory output, such as a video (e.g., via a display) and audio (e.g., via headphones), which operate together to create the illusion that a user is immersed in a virtual world. Such HMDs include a display that provides images to the user. Some HMDs may also include additional optical elements which alter light from the display. Because it is preferable for a HMD to be compact, the geometry between a user's eye, the display, and additional optical elements should generally be precise to prevent distortion of the image viewed by the user. Thus, to prevent HMDs from producing distorted images, the manufacturing process for HMDs should generally ensure the precise alignment of the display and other optical elements in the HMD.

Conventionally, the alignment of the display and other optical elements is accomplished with passive alignment. For example, a display and a reciprocal coupling mechanism of a frame of a HMD may be manufactured with precise mechanical tolerances so that that the display and a frame of the HMD fit together precisely. Although passive alignment may be sufficiently precise to insure adequate quality control, manufacturing the elements of the HMD with the mechanical tolerances required to ensure proper alignment may be prohibitively expensive. Furthermore, a manufacturing process that requires precise machine tolerances may be relatively vulnerable to disruptions in the supply chain. For example, it may not be possible to transition to manufacturing HMDs with a slightly different type of display without entirely reworking the manufacturing process of the other elements of the HMDs.

SUMMARY

A headset alignment system is used to align headset elements within a HMD. The headset alignment system is a feedback system in which the orientation of a headset element is adjusted based on sensors that measure its orientation. Herein, the "orientation" of an object (e.g., a display) refers to its position (e.g., an x-y-z position in a 3-dimensional Cartesian coordinate system), its rotational orientation (e.g., a pitch, yaw, and roll), or both. The orientation of a rigid body may refer to its position and/or rotational orientation for six degrees of freedom or a subset thereof.

Disclosed is a headset alignment system and method for adjusting the position of a headset element (e.g., a display and/or other optical element). Coherent light (e.g., a laser beam) is transmitted through a display of a headset to produce a diffraction pattern on a detector, which detects the diffraction pattern. The orientation of the headset element is determined based in part on the detected diffraction pattern. Based on the determined orientation and a target orientation, an adjustment to the orientation of the headset element is determined. The target orientation may be the orientation at which the headset element is properly aligned. The position of the headset element is adjusted based on the determined adjustment. This method may be repeated until the headset element is determined to be correctly oriented (e.g., when the detected orientation matches the target orientation).

The headset element may also be aligned by detecting the position of one or more target pixels illuminated on a display. One or more target pixels may be displayed on the display of a headset. One or more images of the one or more target pixels may be captured by one or more image capture devices (e.g., digital cameras). The position of the headset element may be determined based on identified locations of the target pixels in the one or more captured images. An adjustment to the position of the headset element may be determined based the determined position. The position of the headset element may be adjusted based on the determined adjustment.

Figure 1A:
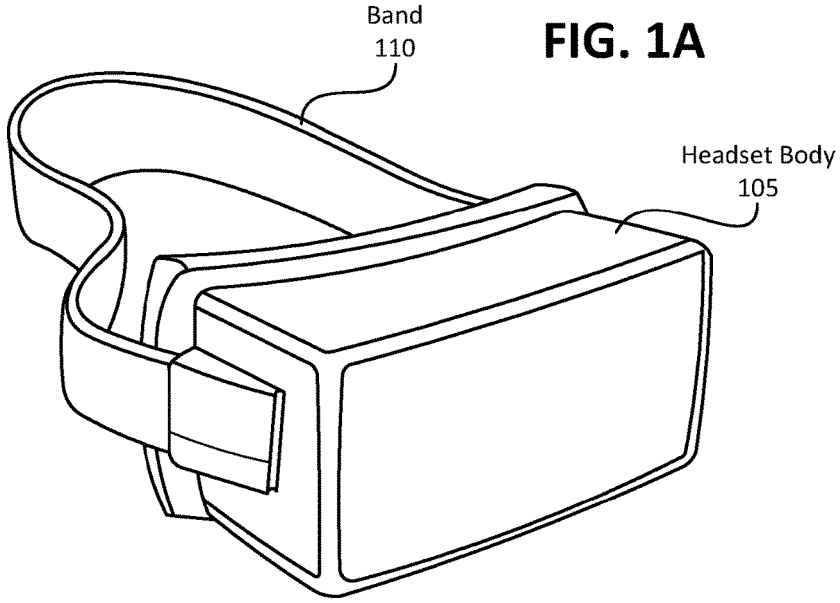
FIG. 1A is an illustration of a headset, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein. Note that for purposes of clarity, only one of each item corresponding to a reference numeral is included and/or labeled in some figures, but when implemented multiple instances of any or all of the depicted items may be employed, as will be appreciated by those of skill in the art.

DETAILED DESCRIPTION

Example Head-Mounted Display

FIG. 1A is an illustration of a HMD 100, in accordance with an embodiment. The HMD 100 may be, for example, a VR headset, an AM headset, or a MR headset. The HMD 100 includes a headset body 105 and a band 110. The headset body 105 includes one or more electronic display elements of an electronic display.

Figure 1B:
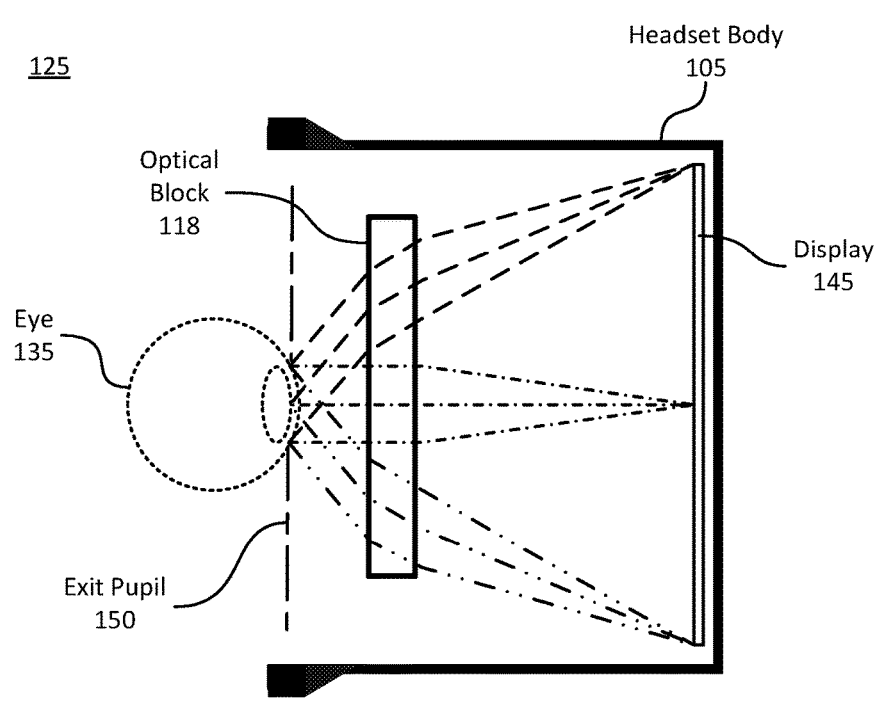
FIG. 1B is a cross section of a headset, in accordance with an embodiment.

FIG. 1B is a cross section 125 of the headset body 105 of the embodiment of a HMD 100 shown in FIG. 1A. As shown in FIG. 1B, the HMD 100 includes the headset body 105, an optical block 118, and a display 145. The exit pupil 150 illustrated in FIG. 1B is the location of the HMD 100 where a user's eye 135 is positioned. For purposes of illustration, FIG. 1B shows a cross section 125 associated with a single eye 135, but, in some embodiments, another optical block, separate from the optical block 118, provides altered image light to another eye of the user. In some embodiments, the optical block 118 provides altered image light to both eyes of a user.

The display 145 projects image light toward the optical block 118, which alters the projected image. For example, the optical block 118 magnifies and corrects optical errors associated with the projected image. The optical block 118 may be configured to correct for fixed pattern noise by slightly blurring sub-pixels. The optical block 118 directs the altered image light to the exit pupil 150 for presentation to the user.

The display 145 includes a display area comprising a plurality of sub-pixels, where a sub-pixel is a discrete light-emitting component. Different sub-pixels are separated from each other by dark space. For example, a sub-pixel emits red light, yellow light, blue light, green light, white light, or any other suitable color of light. In some embodiments, images projected by the display 145 are rendered on the sub-pixel level. This is distinct from, say an RGB (red-green-blue) layout, which has discrete red, green, and blue pixels (red, green, and blue) and each pixel in the RGB layout includes a red sub-pixel, which is adjacent to a green sub-pixel that is adjacent to a blue sub-pixel; the red, green, and blue sub-pixels operate together to form different colors. In an RGB layout a sub-pixel in a pixel is restricted to working within that pixel. However, in some embodiments, sub-pixels in the electronic display operate within multiple "logical" pixels in their surrounding vicinity to form different colors. The sub-pixels are arranged on the display area of the display 145 in a sub-pixel array. Examples of a sub-pixel array include PENTILE® RGBG and PENTILE® RGBW. The display 145 may be, for example, a light-emitting diode (LED) display, an organic LED (OLED) display, a transparent OLED (TOLED) display, an active-matrix OLED (AMOLED) display, a stacked OLED (SOLED) display, or a liquid crystal display (LCD).

The optical block 118 includes one or more optical elements that adjust an image projected by the display 145 to the user by the HMD 100. In some embodiments, the optical block 118 is positioned at least 35 mm from the display 145. A portion of an optical element in the optical block 118 may include a diffractive surface. In various embodiments, an optical element in the optical block 118 includes a refractive surface (e.g., a concave surface), a diffractive surface (e.g., a Fresnel surface, a binary surface, or some other type of diffractive element), or some combination thereof. Portions of the diffractive surface and/or the refractive surface may include a flat portion, a curved portion, or both. The diffractive surface of an optical element may be uniform or may have a higher density of grooves near the center of the optical element. A diffractive optical element is an optical element including at least a portion of a diffractive surface. Additionally, in some embodiments, an optical element may be an aperture, a filter, or any other suitable optical element that affects the image projected by the display 145. In some embodiments, one or more of the optical elements in the optical block 118 may have one or more coatings, such as anti-reflective coatings.

The optical block 118 magnifies image light projected by the display 145 and corrects optical errors associated with the image light. Magnification of the image light allows the display 145 to be physically smaller, weigh less, and consume less power than larger displays. Additionally, magnification may increase a field of view of the displayed media. For example, the field of view of the displayed media is such that the displayed media is presented using almost all (e.g., 110° diagonal), and in some cases all, of the user's field of view.

The optical block 118 may be designed to correct one or more types of optical error. Optical error may be fixed pattern noise (i.e., the screen door effect), two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error. The optical block 118 may correct for fixed pattern noise by slightly blurring the image of each sub-pixel so the blurred sub-pixels mask the dark space between the sub-pixels via a Fresnel lens or other diffractive surface. In some embodiments, the media provided to the display 145 for display is pre-distorted, and the optical block 118 corrects the distortion.

Example AMOLED Display

Figure 2:
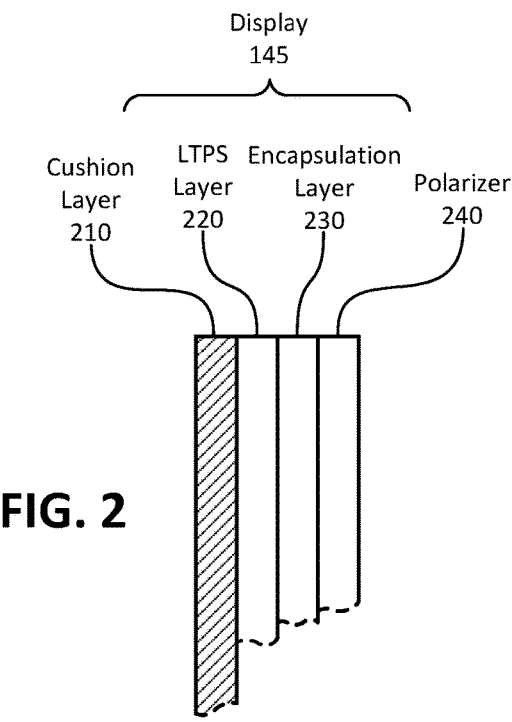
FIG. 2 is a diagram of the layers of a display, in accordance with an embodiment.

FIG. 2 illustrates a cross-section of a display 145 in accordance with an embodiment. The display 145 is an AMOLED display that includes four layers: a cushion layer 210, a low-temperature polycrystalline silicon (LTPS) layer 220, encapsulation layer 230, and a polarizer 240.

The cushion layer 210 is a layer of material that protects and supports the display 145. The cushion layer 210 may be, for example, cushion tape or a cushion sheet. The cushion layer 210 may, for example, consist of synthetic rubber or rubber foam (e.g., polyurethane). The cushion layer 210 may be at the back of the display 145.

The LTPS layer 220 includes a plurality of emission devices and a plurality of driving thin-film transistors (TFTs). An emission device may be, e.g., an OLED, an LED, a TOLED, some other device that emits light, or some combination thereof. Each emission device corresponds to a single sub-pixel, and has a color type. The color type of an emission device determines what range of light wavelengths is emitted from the emission device. Color type may be, for example, red light, yellow light, blue light, green light, white light, or any other suitable color of light. The LTPS layer 220 may include emission devices of the same color type and/or different color types. Additionally, the emission devices are arranged in the LTPS layer 220 in a particular spatial configuration like, for example, PENTILE® RGBG, PENTILE® RGBW, RGB, or some another suitable arrangement emission devices. The driving TFTs provide, e.g., power, control, etc., to the emission devices. The LTPS layer 220 may include a substrate and a TFT layer disposed on the substrate. The substrate may be, e.g., silicon, silicon dioxide, aluminum oxide, plastic, or some other semiconductor that is at least partially transmissive to light. An emission layer that includes an array of emission devices is disposes on the TFT layer.

The LTPS layer 220 is partially transparent. The elements (e.g., TFTs and emission devices) of the LTPS layer 220 act as diffractive elements for incident light that passes through the display 145. Thus, the LTPS layer 220 may diffract light in a manner similar to a diffraction grating. The diffractive elements of the LTPS layer 220 are arranged in a regular, repeating pattern. Because of the regular structure of the LTPS layer 220, light that passes through the LTPS layer 220 can be diffracted to produce a diffraction pattern. The LTPS layer 220, upon incidence of coherent, collimated light, can produce multiple beams in the far-field.

In alternate embodiments, an alternate backplane is used instead of an LTPS-TFT backplane. In various embodiments, the backplane of the display 145 may be an oxide TFT backplane, an amorphous-silicon (a-Si) backplane, a microcrystalline silicon (μc-Si) backplane, are another type of backplane.

The encapsulation layer 230 is a layer of glass disposed on the LTPS layer 220. The encapsulation layer 230 protects the LTPS layer 220 from environmental factors (e.g., dust, water, etc.). The encapsulation layer 230 is transparent to the light emitted from the LTPS layer 220, and may be formed from, e.g., transparent glass, sapphire, plastic, some other material that is transparent to the light emitted by LTPS layer 220, or some combination thereof. The encapsulation layer 230 also can provide structural support to the display 145. The encapsulation layer 230 is between the LTPS layer 220 and the polarizer 240.

The polarizer 240 is a layer of the display 145 that polarizes light that passes through it. The polarizer may be, for example, a synthetic plastic polarizer (e.g., a Polaroid polarizing filter). In some embodiments, the polarizer 240 includes an anti-reflective coating. The polarizer may be formed on the encapsulation layer 230. In some embodiments, the polarizer 240 is omitted from the display 145.

Although the display 145 is described herein as an AMO-LED display that includes encapsulation layer 230, the HMD 100 may, in alternate embodiments, include any other type of display capable of diffracting incident light. For example, the display 145 may be disposed onto a different substrate (e.g., a flexible polymer) or may be a passive matrix OLED display.

As another example, the display 145 may be a liquid crystal display (LCD). Regular structures of the LCD display may act as diffractive elements. The LCD display may include a backlight, a first polarizer, a TFT backplane, a liquid crystal layer, a color filter, and a second polarizer.

Example Diffraction Pattern Setup

Figure 3:
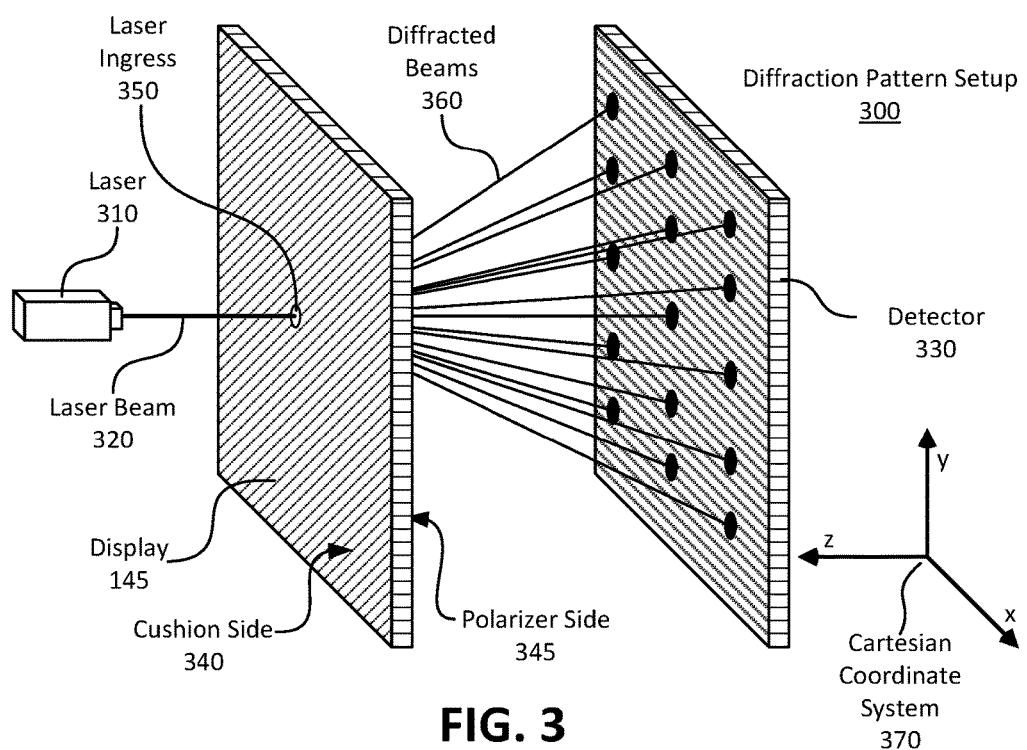
FIG. 3 is a diagram of a laser beam incident on a display producing a diffraction pattern on a detector, in accordance with an embodiment.

FIG. 3 is a diagram of a laser beam incident on a display 145 producing a diffraction pattern on a detector 330, in accordance with an embodiment. The diffraction pattern setup 300 includes a laser 310, a display 145, and the detector 330. In FIG. 3, the display 145 and the detector 330 are parallel to the x-y plane of the Cartesian coordinate system 370. The laser 310 produces a laser beam 320 that is orthogonal to the display 145 and parallel to the z-axis of the Cartesian coordinate system 370. The diffraction pattern setup 300 and/or setups similar thereto are used to align the display 145 in a HMD 100 (not illustrated in FIG. 3) as further described below in conjunction with FIG. 5. In FIG. 3, the display 145 is shown in its target orientation (e.g., parallel to the detector 330). Aligning the display 145 may include moving and/or rotating the display 145 to the target orientation.

The laser 310 is a device that produces a laser beam 320. The laser beam 320 is a narrow beam of collimated coherent light with a very narrow bandwidth. In some embodiments, the wavelength of the laser beam 320 is shorter than the spacial period of the repeating diffractive elements in the display 145. The laser 310 includes a laser generator (e.g., gain medium in an optical cavity with an output coupler), circuitry to provide power to the laser generator, and, optionally, collimation optics. The collimation optics may adjust the size, collimation, and/or power profile of the beam produced by the laser generator to produce the laser beam 320.

In some embodiments, the laser 310 produces a laser beam 320 that is polarized. The direction of the polarization of the laser beam 320 may be aligned with the polarizer 240 of the display 145. For example, if the polarizer 240 is a linear polarizer, the laser 310 may emit a laser beam 320 that is linearly polarized with a polarization axis in the same direction as the polarization direction of the polarizer 240. As another example, if the polarizer 240 is a circular polarizer, the handedness (i.e., left-handed or right-handed) of the laser beam 320 produced by the laser 310 may be the same as that of the polarizer 240.

The laser beam 320 is incident on the cushion side 340 of the display 145 at a laser ingress 350. The laser ingress 350 is an opening (e.g., an aperture, a slit, or a gap) in the cushion layer 210. In an alternate embodiment where the display 145 is a LCD screen, the laser ingress 350 may be a gap a small opening in the backlight. In another embodiment, the cushion layer 210, in the case where the display 145 is an OLED display, or the backlight, in the case where the display 145 is a LCD, is not attached to the rest of the display 145, while the diffraction pattern is being produced. The cushion layer 210 or the backlight may be attached to the display 145 subsequently (e.g., after the display 145 has been aligned and/or fixed in the HMD 100).

The laser beam 320 passes through the cushion layer 210 at the laser ingress 350 and is then diffracted by the diffractive elements (e.g., TFTs or emitters of an LTPS layer 220) in the display 145. Because the diffractive elements are arranged in a regular pattern, the diffraction produced thereby, results in a diffraction pattern.

The display 145 may be an AMOLED display as shown in FIG. 2 or any other display that is at least semi-transparent with repeating structures that can produce a diffraction pattern. The display 145 includes repeating diffractive elements (e.g., transistors or OLEDs). The diffractive elements may be periodic in two or more directions $d_1$ and $d_2$ along the x-y plane or some other plane. Herein, the two directions $d_1$ and $d_2$ refer to the directions in which the structure of the diffractive elements of the display 145 is periodic that have the two shortest respective periods. The directions $d_1$ and $d_2$ are analogous to the grating vectors of a diffraction grating. In some embodiments, the directions $d_1$ and $d_2$ are orthogonal directions (i.e., $d_1 \cdot d_2 = 0$). The directions $d_1$ and $d_2$ may correspond to the horizontal direction (e.g., in the direction of the x-axis) and the vertical direction (e.g., in the direction of the y-axis), respectively. It is noted that the terms "horizontal" and "vertical" are used to herein to refer to relative directions used for notational convenience and do not imply that the headset or elements thereof are required to have a particular orientation with respect to gravity.

The laser beam 320 is diffracted by the display 145 as it passes through it and radiates out from the polarizer side 345 of the display 145. Diffraction of the laser beam 320 produces diffracted light most of which is contained in diffracted beams 360. The diffracted light is incident on the detector 330, producing a diffraction pattern. Photons from the laser beam 320 are diffracted by diffractive elements in the display 145 (e.g., elements of a LTPS layer 220 of the display 145) and combine constructively to produce a diffraction pattern on the detector 330. The diffraction pattern is a 2-dimensional pattern on the surface of the detector 330. The diffraction pattern is based on the cross-section of the laser beam 320, the wavelength of the laser beam 320, and the pattern and size of the diffractive elements in the display 145. In some embodiments, the vertical pattern of the diffractive elements in the display 145 is different than the horizontal pattern, which causes the diffraction pattern to be different in the horizontal direction that in the vertical direction.

The phenomenon of diffracted beams 360 is the result of constructive interference of light. For the purposes of illustration, the laser beam 320 is described as having a cross-section of negligible size (i.e., the laser beam 320 is idealized as a line) and the diffraction of the laser beam 320 is described as occurring at a single point in the display 145 (e.g., at or near the laser ingress 350). Given these assumptions, constructive interference is maximized in the far-field at a finite number of directions from the point of diffraction. Each of these directions correspond to a respective diffracted beam 360 produced by the diffraction of the laser beam 320 and may be referenced by a two-dimensional order (m,n) for each diffracted beam 360, where m and n are integers. The zero order beam (i.e., (m,n)=(0,0)) is collinear with the laser beam 320. Generally, the zero order beam has the greatest intensity. The other diffracted beams 360 (i.e., diffracted beams 360 with an order (m,n) such that m and n are nonzero integers) correspond to light that has been diffracted. Each diffracted beam 360 of order (m,n) corresponds to two respective angles $\theta_m$ and $\phi_n$. The angle $\theta_m$ of the diffracted beam 360 is the angle from the direction of the zero order beam (i.e., the direction parallel to the z-axis that passes through the diffraction point) toward the direction $d_1$ (e.g., the angle $\theta_m$ may be the horizontal angle (the yaw) of the diffracted beam 360). Similarly, the angle $\phi_n$ of the diffracted beam 360 is the angle from the direction of the zero order beam toward the direction $d_2$ (e.g., the angle $\phi_n$ may be the vertical angle (the pitch) of the diffracted beam 360). Thus, the integers m and n of the order correspond to the directions of $d_1$ and $d_2$, respectively. For example, m may be the horizontal order and n may be the vertical order.

If the directions of $d_1$ and $d_2$ correspond to the x-axis and the y-axis, respectively, then the fifteen diffracted beams 360 shown in FIG. 3 correspond to beams with an order of (m,n) where −1≤m≤1 and −2≤n≤2. In FIG. 3, additional beam orders are omitted for ease of illustration. Each diffracted beam 360 produces a respective diffraction fringe (i.e., a bright area in the diffraction pattern) in the diffraction pattern on the detector 330. Thus, the diffraction pattern illustrated in FIG. 3 includes 15 fringes, each corresponding to a respective order (m,n). The diffraction pattern may include a grid of fringes. Each fringe may be a small bright area in the diffraction pattern.

The detector 330 is a surface that converts incident light into an electrical signal. The detector 330 includes an array of photo sensors. The detector 330 may be an image sensor, such as, a semiconductor charge-coupled device (CCD) image sensor, active pixel sensors in a complementary metal-oxide-semiconductor (CMOS) device, or some other type of imaging sensor. The detector 330 may include circuitry for controlling the array of photo sensors and for converting the signals captured by the photo sensors into a digital image.

The detector 330 detects the diffraction pattern produced by the laser 310 and the display 145 and converts it into a two-dimensional digital signal. In some embodiments, the detector 330 is a single-channel image sensor (i.e., an image sensor that is not sensitive to multiple color channels). In some embodiments, the detector 330 is selected to be highly sensitive to light of the same wavelength as the laser beam 320.

In FIG. 3 and elsewhere herein, the detector 330 is depicted as a bare image sensor. That is, unlike a camera which uses a series of lenses to focus light, the diffracted light is captured directly by the detector 330 without being refracted by a lens. However, in some embodiments, the detector 330 is part of an image capture device (e.g., a camera) that includes one or more lenses. Because the diffraction pattern radiates from an approximate point source (e.g., the point where the laser beam 320 is incident on the display 145), if the image capture device is focused on the display 145, the captured image will be a single bright spot, rather than a diffraction pattern. Thus, when capturing an image of the diffraction pattern, the image capture device may be focused on a point past the display 145 (e.g., focused on a point with a more negative z-position than the display 145). In some embodiments, the image capture device may be set to focus on a distant position, set focus to infinity, or set to focus past infinity.

Figure 4A:
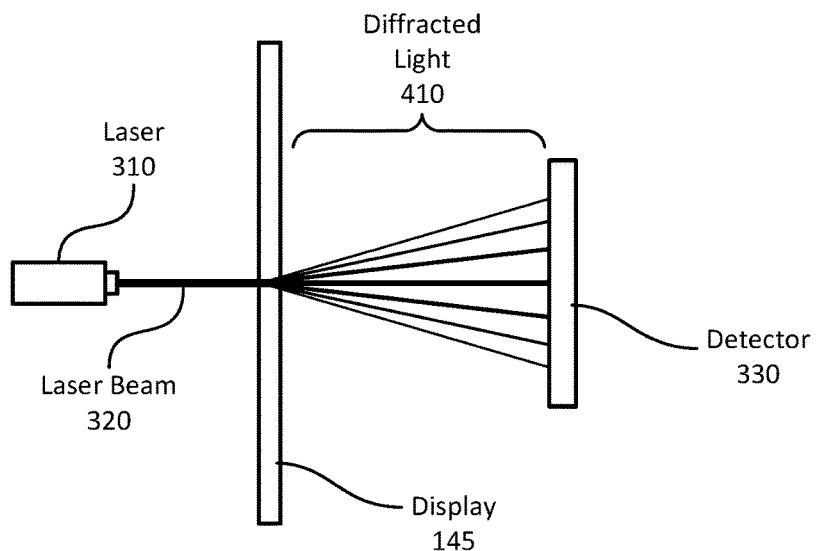
FIG. 4A is a diagram of a laser beam incident on a display producing a diffraction pattern on a detector, in accordance with an embodiment.

FIG. 4A is a diagram of a laser beam 320 incident on a display 145 producing a diffraction pattern on a detector 330, in accordance with an embodiment. FIG. 4A illustrates a cross-section (e.g., a horizontal cross-section) of a diffraction pattern setup 400 similar to the diffraction pattern setup 300 illustrated in FIG. 3. The diffracted light 410 shown in FIG. 4A includes diffracted beams 360 on the plane of the cross-section. Each diffracted beam 360 illustrated in FIG. 4A is a beam of order (m,0) where −3≤m≤3. Each diffracted beam 360 produces a respective fringe incident on and detected by the detector 330. Based on the position of each fringe (e.g., the distances between fringes) the orientation of the display 145 may be determined as described further below in conjunction with FIGS. 5 and 7.

Figure 4B:
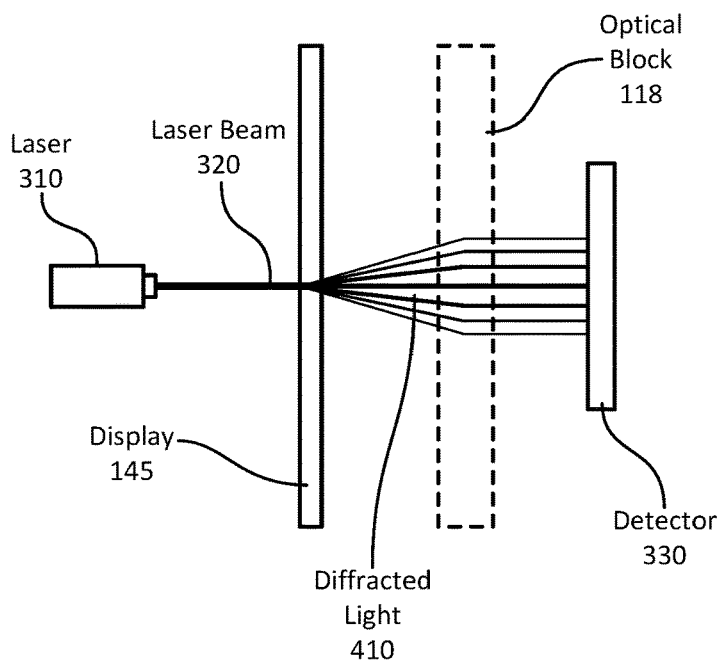
FIG. 4B is a diagram of a laser beam incident on a display producing a diffraction pattern on a detector, after passing through an optical block, in accordance with an embodiment.

FIG. 4B is a diagram of a laser beam 320 incident on a display 145 producing a diffraction pattern on a detector 330, after passing through an optical block 118, in accordance with an embodiment. The diffraction pattern setup 420 of FIG. 4B corresponds to the diffraction pattern setup 400 of FIG. 4A with the addition of the optical block 118. The optical block 118 refracts the diffracted light 410. Accordingly, the optical block 118 alters the diffraction pattern captured by the detector 330. In some embodiments, the refracted beams are approximately collimated by the optical block 118. After being refracted by the optical block 118, the diffracted light is incident upon the detector 330 producing a diffraction pattern that is indicative of the orientation of the optical block 118. The orientation of the optical block 118 may be determined based on the diffraction pattern as described further below in conjunction with FIGS. 5 and 7.

Example Headset Element Alignment Systems

Figure 5:
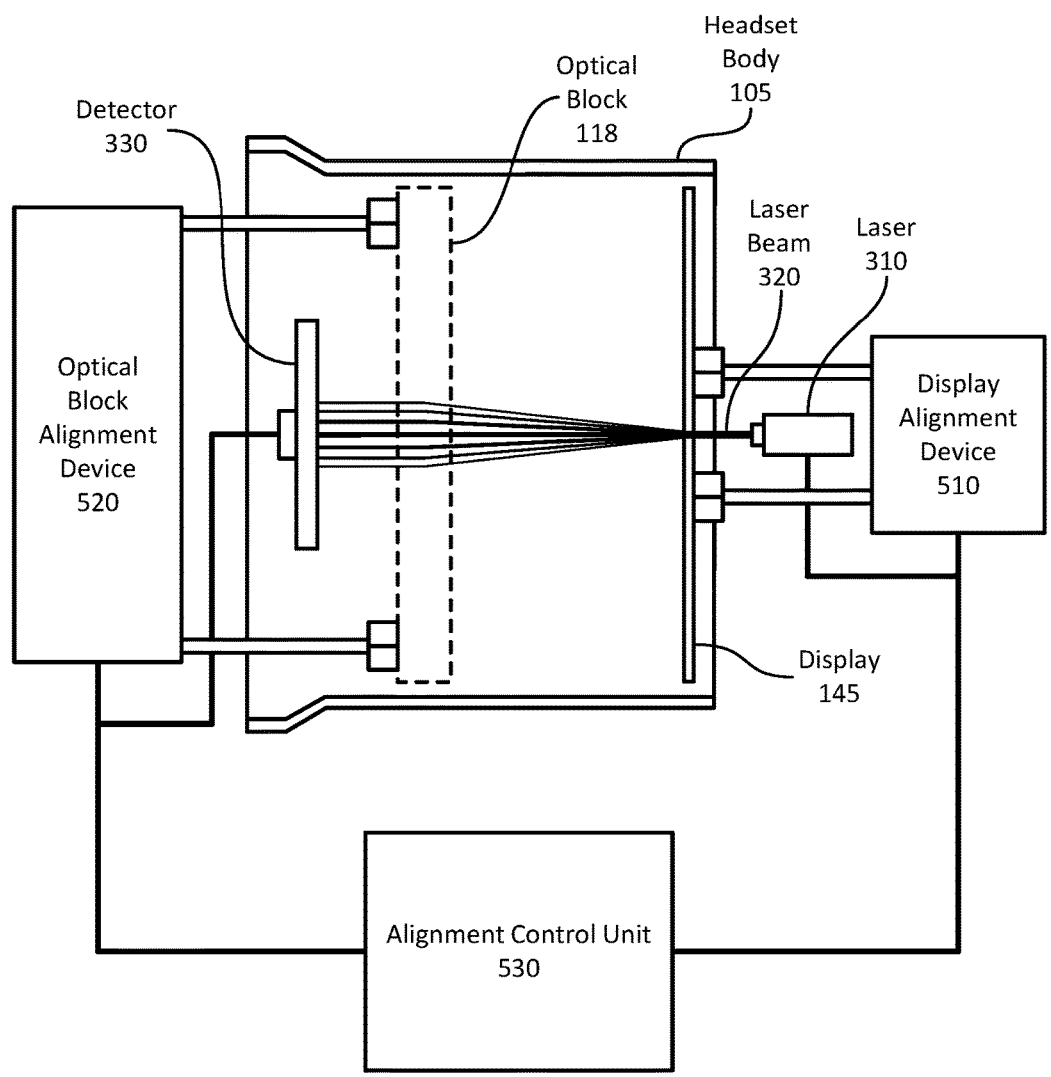
FIG. 5 is a diagram of a headset alignment system using a diffraction pattern, in accordance with an embodiment.

FIG. 5 is a diagram of a headset alignment system 500 using a diffraction pattern, in accordance with an embodiment. FIG. 5 illustrates a cross-section (e.g., a vertical cross-section) of the headset alignment system 500. The headset alignment system 500 includes a detector 330, a laser 310, a display alignment device 510, an optical block alignment device 520, and an alignment control unit 530 for aligning the display 145 and the optical block 118 with the headset body 105 of the HMD 100. The headset alignment system 500 aligns the display 145 and, optionally, the optical block 118.

The display alignment device 510 is a device that couples to the display 145 and adjusts its orientation in one or more degrees of freedom (e.g., x, y, z, roll (tip), pitch, yaw (tilt)). The display alignment device 510 includes one or more electro-mechanical devices, such as a goniometer, to adjust the display 145. The display alignment device 510 adjusts a tip and tilt of the display 145. Herein, the "tip" of an object refers to its rotational orientation about a horizontal axis, such as the x-axis illustrated in the Cartesian coordinate system 370 of FIG. 3. The "tilt" of an object refers to its rotational orientation about the vertical axis, such as the y-axis illustrated in the Cartesian coordinate system 370. The display alignment device 510 may also adjust the roll of the display 145, where the "roll" refers to the rotational orientation of the display 145 about the axis orthogonal to its surface (e.g., the z-axis in the Cartesian coordinate system 370). The display alignment device 510 may also adjust the position of the display 145, i.e., the display alignment device 510 may translate the display 145 in space. Adjusting the position of the display 145 includes adjusting the x-position (i.e., the position of the center of the display 145 along the x-axis in Cartesian coordinate system 370), the y-position, the z-position, or some combination thereof.

The optical block alignment device 520 is a device that couples to the optical block 118 and adjusts its orientation. The optical block alignment device 510 includes one or more electro-mechanical devices, such as a goniometer and servos, to adjust the orientation of the optical block 118. The optical block alignment device 510 may adjust some combination of the tip, tilt, roll, and the spatial position of the optical block 118. In some embodiments, the optical block alignment device 520 is mechanically coupled to the display alignment device 510 so that the relative orientations of the display alignment device 510 and the optical block alignment device 520 are fixed.

The alignment control unit 530 is a computer including one or more processors and interfaces for controlling the display alignment device 510 and the optical block alignment device 520. The alignment control unit 530 also interfaces with the detector 330 to receive captured images and may control it in some embodiments. The alignment control unit 530 also controls the laser 310 in some embodiments. The alignment control unit 530 may include software instructions stored on non-volatile memory that, when executed by the one or more processors, perform the functions ascribed herein to the alignment control unit 530.

The alignment control unit 530 receives a digital image of the diffraction pattern captured by the detector 330. Although, in FIG. 5, the detector 330 is illustrated as a bare image sensor, in some embodiments, the detector 330 is part of an image capture device. Based on the digital image, the alignment control unit 530 adjusts the orientation of the optical block 118, the display 145, or both. In some embodiments, the alignment control unit 530 adjusts the orientation of the display 145 before the optical block 118 is inserted into the HMD 100. The alignment control unit 530 is described further below in conjunction with FIG. 7.

In some embodiments, the headset alignment system 500 omits the optical block 118 and optical block alignment device 520 and only aligns the display 145. In such an embodiment, diffracted light that radiates from the display 145 and produces the diffraction pattern may be directly incident upon the detector 330 without first passing through additional optical elements. The headset alignment system 500 may insert the optical block 118 (or it may be inserted by, e.g., a technician) into the headset body 105 after the display 145 is aligned and then align the optical block 118. In an alternate embodiment, the optical block 118 is in the headset body 105 prior to the display 145 being aligned (or prior to the display 145 being completely aligned) and refracts or otherwise alters the diffracted light radiating from the display 145 before it is detected by the detector 330. The optical block 118 and display 145 may be adjusted simultaneously or sequentially.

Figure 6:
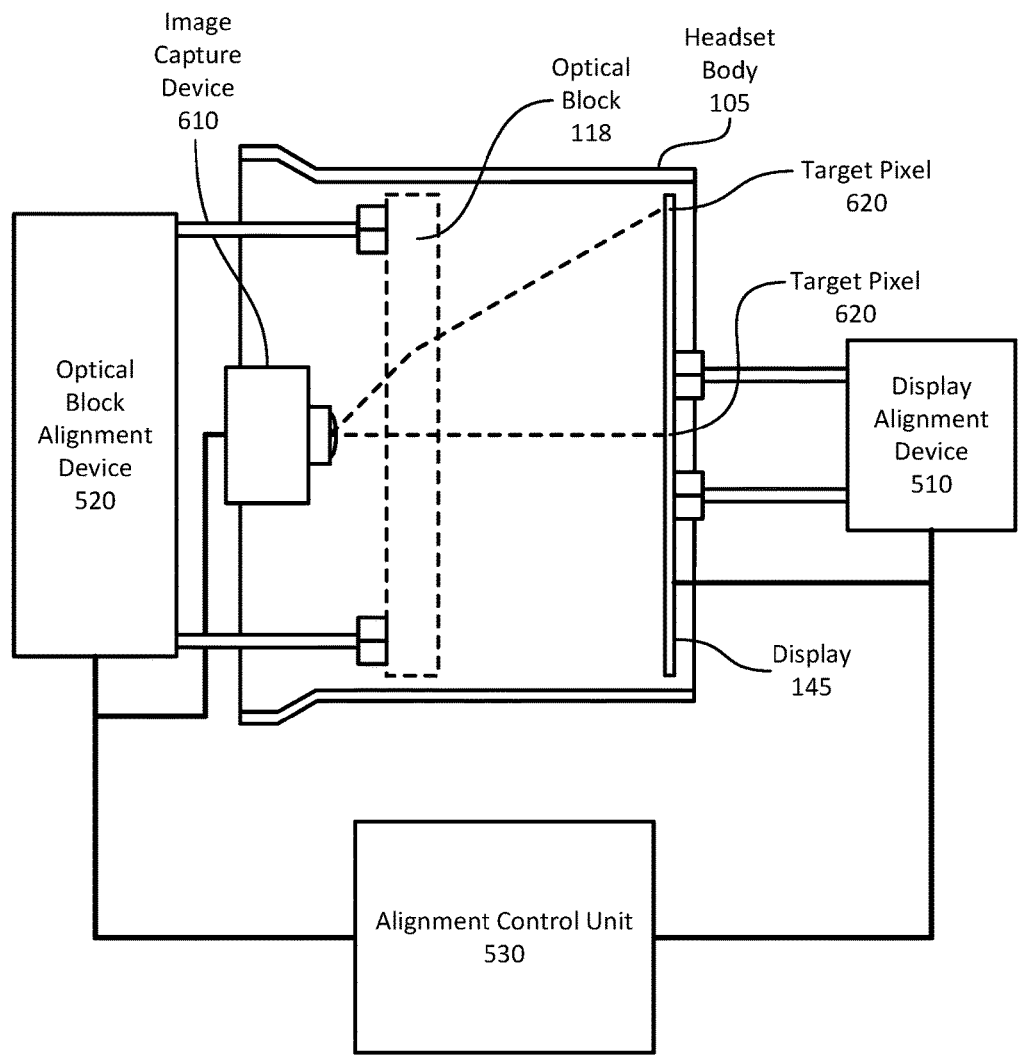
FIG. 6 is a diagram of a headset alignment system using target pixel detection, in accordance with an embodiment.

FIG. 6 is a diagram of a headset alignment system using target pixel detection, in accordance with an embodiment. The headset alignment system 600 includes an image capture device 610, a display alignment device 510, an optical block alignment device 520, and an alignment control unit 530 for aligning the display 145 and the optical block 118 with the headset body 105 of the HMD 100. The headset alignment system 600 aligns the display 145 and, optionally, the optical block 118.

The headset alignment system 600 of FIG. 6 is similar to the headset alignment system 500 of FIG. 5 except that the detector 330 is part of an image capture device 610 (e.g., a digital camera) instead of a bare image sensor. Additionally, the headset alignment system 600 detects one or more illuminated pixels on the display 145 instead of the diffraction pattern. FIG. 6 illustrates two target pixels 620 which are illuminated on the display 145.

Although FIG. 6 depicts a single image capture device 610, the headset alignment system 600 may include multiple image capture devices 610 each sending captured images of the target pixels 620 to the alignment control unit, which aligns the optical block 118 and/or the display 145 based on the captured images. Each of the image capture devices 610 may be placed so as to capture images at the exit pupil 150 of the HMD 100. In some embodiments, the alignment control unit 530 controls the display 145 to selectively illuminate target pixels 620. The display 145 may display target pixels 620 simultaneously or one at a time.

In some embodiments, the headset alignment system 600 omits the optical block 118 and optical block alignment device 520 and only aligns the display 145. The headset alignment system 600 may insert the optical block 118 into the headset body 105 (or it may be inserted by, e.g., a technician) after the display 145 is aligned and then align the optical block 118 using target pixels 620. In an alternate embodiment, the optical block 118 is in the headset body 105 prior to the display 145 being aligned (or prior to the display 145 being completely aligned) and refracts or otherwise alters the diffracted light radiating from the display 145 before it is detected by the detector 330. The optical block 118 and display 145 may be adjusted by the headset alignment system 600 simultaneously or sequentially based on the displayed target pixels 620.

FIGS. 5 and 6 depict alignment based on diffraction of a laser beam 320 by the display 145 and alignment based on target pixels as being performed by two different headset alignment systems 500 and 600. However, in some embodiments, the two systems are combined into a single system. For example, in one embodiment, a single combined system includes a detector 330 collinear with the laser beam 320 and one or more image capture devices 610 at other locations. The detector 330 may be configured to be insensitive to light of the same frequency (or frequencies) as the light produced by the target pixels 620. The detector 330 may have a color filter to remove light from the illuminated target pixels 620. The alignment control unit 530 may receive images captured by both the detector 330 and the one or more image capture devices 610 and align the optical block 118 and the display 145 based on the captured images.

In an alternate embodiment, the single combined system uses a detector 330 that is part of an image capture device 610 to detect the diffraction pattern produced by the laser beam 320 and the display 145 instead of a bare image sensor as depicted in FIG. 5. In this embodiment, the alignment control unit 530 may adjust the focus of the image capture device 610 to infinity or some large focus prior to capturing an image of the diffraction pattern. The alignment control unit 530 may also adjust the focus of the image capture device 610 to focus on the distance of a target pixel 620 prior to capturing an image of one or more of the target pixels 620.

Figure 7:
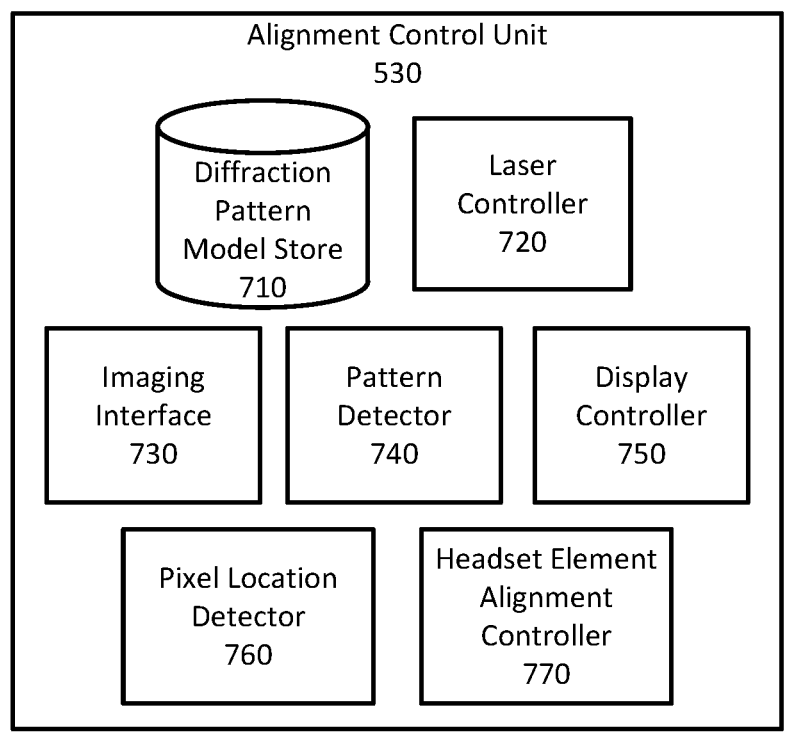
FIG. 7 is a block diagram of an alignment control unit, in accordance with an embodiment.

FIG. 7 is a block diagram of the alignment control unit 530, in accordance with an embodiment. Some embodiments of the alignment control unit 530 have different modules than those described here. Similarly, the functions can be distributed among the modules in a different manner than is described here. The alignment control unit 530 includes a diffraction pattern model store 710, a laser controller 720, an imaging interface 730, a pattern detector 740, a display controller 750, a pixel location detector 760, and a headset element alignment controller 770.

The diffraction pattern model store 710 is a memory, such as a ROM, DRAM, SRAM, or some combination thereof that stores a model of the diffraction pattern. The diffraction pattern model store 710 may be part of a larger digital memory. The diffraction pattern model store 710 stores a diffraction pattern model $M_D$ used to associate images of diffraction patterns with an orientation of a headset element (e.g., the optical block 118, the display 145, or both). The diffraction pattern model $M_D$ may be a model of the diffraction pattern produced by the display 145 and/or optical block 118 at particular orientation(s). In some embodiments, the diffraction pattern model $M_D$ includes predicted pixel positions (discussed in detail with regard to FIG. 9) that correspond to a display, an optics block, or both, being in proper alignment with an HMD. The orientation of the display 145 and/or optical block 118 may be defined with respect to some reference coordinate system.

In some embodiments, the diffraction pattern model store 710 includes a diffraction pattern model $M_D$ that can operate in one or modes. These modes can include a "display only mode," an "optical block only mode," a "display and optical block mode," or some subset thereof. Each mode corresponds to the headset element or elements in the HMD 100 for which the diffraction pattern model $M_D$ models the diffraction and/or refraction. Thus, for example, the display only mode corresponds to a model of the diffraction pattern produced by the display 145 without being refracted by the optical block 118 (e.g., as depicted in FIGS. 3 and 4A). The modes implemented by the diffraction pattern model $M_D$ depend on the alignment process performed by the alignment control unit 530. For example, if the process performed by the alignment control unit 530 does not include a step in which only the optical block 118 diffracts light, the diffraction pattern model $M_D$ may omit the optical block only mode.

The diffraction pattern model $M_D$ may be used to associate an image of a diffraction pattern captured by the detector 330 (e.g., a bare image sensor or a detector 330 that is part of an image capture device 610) with a headset element orientation vector. The headset element orientation vector may include parameters specifying the position (e.g., in a 3-dimensional Cartesian coordinate system) and rotational orientation (e.g., the tilt, tip, and roll) of a headset element (e.g., the optical block 118, the display 145). The headset element orientation vector may be defined relative to a reference coordinate system based on the position of the HMD 100 (e.g., relative to the target orientation for the headset element). The reference coordinate system may be defined by the alignment control unit 530 based on fiducials on the HMD 100. The alignment control unit 530 may include an imaging system for detecting the position of fiducials on the HMD 100 so as to determine this reference coordinate system.

The headset element vector may depend on the mode of operation for the diffraction pattern model $M_D$. In some embodiments, the diffraction pattern model $M_D$ operating in the display only mode associates a captured image with a display orientation vector $V_D$. The diffraction pattern model $M_D$ operating in the optical block only mode may associate a captured image with an optical block orientation vector $V_{OB}$. In some embodiments, the diffraction pattern model $M_D$ operating in the display and optical block mode associates a captured image with both an optical block orientation vector $V_{OB}$ and a display orientation vector $V_D$. In an alternate embodiment, the diffraction pattern model $M_D$, operating in the display and optical block mode, is built on the assumption that the display 145 is properly aligned and only maps to an optical block orientation vector $V_{OB}$. In another alternate embodiment, the diffraction pattern model $M_D$, operating in a display and optical block mode, is built on the assumption that the optical block 118 is properly aligned and only maps to a display orientation vector $V_D$.

In some embodiments, a diffraction pattern model $M_D$ is a mapping between two-dimensional images of a diffraction pattern and a headset element orientation vector (e.g., $V_{OB}$, $V_D$, or both). In alternate embodiments, the diffraction pattern model $M_D$ is a mapping between a set of positions for fringes (e.g., local intensity maxima) in a diffraction pattern and a headset element orientation vector (e.g., $V_{OB}$, $V_D$, or both). The diffraction pattern model $M_D$ may be based on a statistical model build from images of diffraction patterns captured with known orientations for headset elements (e.g., known values of $V_{OB}$ and/or $V_D$).

The laser controller 720 is an interface for controlling the laser 310. The laser controller 720 may switch the laser 310 on and off to control whether a laser beam 320 is produced.

The imaging interface 730 connects to the detector 330 and/or one or more image capture devices 610. The imaging interface 730 includes one or more hardware and software interfaces for communicating with the detector 330 and/or one or more image capture devices 610. The imaging interface 730 may control the detector 330 and/or images capture devices 610 to control when images are captured. The imaging interface 730 is configured to receive the digital images captured from the one or more image capture devices 610 and/or the detector 330.

The pattern detector 740 determines the orientation of the headset elements (e.g., the optical block 118 and/or the display 145) based on a captured image (or captured images) of the diffraction pattern from the detector 330 and/or the image capture device 610. The pattern detector 740 is a software module, a hardware module, or some combination thereof. The pattern detector 740 determines the optical block orientation vector $V_{OB}$ and a display orientation vector $V_D$ based on the diffraction pattern models $M_D$ stored in the diffraction pattern model store 710. The laser 310, the detector 330, the laser controller 720, the imaging interface 730, and the pattern detector 740 interoperate as an active sensor to determine the position and/or orientation of the display 145 and/or the optical block 118.

In some embodiments, the pattern detector 740 determines the optical block orientation vector $V_{OB}$ and/or the display orientation vector $V_D$ by identifying the locations of fringes (i.e., bright areas in the image) in one or more image of the diffraction pattern. The pattern detector 740 may, e.g., identify the zero order fringe by analyzing the image intensity across a captured image. The beam with the highest image intensity is generally the zero order fringe. The pattern detector 740 may determine the order (m,n) of each fringe based on the relative positions of the fringes in the image. The pattern detector 740 may determine the locations of the fringes relative to the zero order fringe (i.e., the fringe of order (0,0)).

The pattern detector 740 may determine, based on the diffraction pattern model $M_D$, the distance between the display 145 and the detector 330 by detecting a scaling (e.g., isotropic scaling) of the diffraction pattern in a captured image. The pattern detector 740 determines this distance (e.g., the position of the display 145 on the z-axis of the Cartesian coordinate system 370) based on the scaling (i.e., size) of the diffraction pattern in the captured image. A larger scaling corresponds (e.g., linearly corresponds) to a larger distance between the display 145 and the detector 330. The pattern detector 740 may determine the distance between the display and the detector 330 based on a linear relationship between the distance and the scaling of the diffraction pattern. In embodiments in which the pattern detector 740 determines the location of fringes in the image, scaling of the diffraction pattern corresponds to scaling of the distances between the fringes.

The pattern detector 740 may determine the roll of the display 145 by detecting a rotational transform of the diffraction pattern (e.g., a rotational transform of the image of the diffraction pattern and/or of the positions of the fringes) based on the diffraction pattern model $M_D$. The pattern detector 740 may determine the value of the roll of display 145 based on the angle of this rotational transform.

The pattern detector 740 may determine the tip and tilt of this display 145 based on one or more captured images based on the diffraction pattern model $M_D$. A horizontal distortion of the diffraction pattern in a captured image may indicate a tilt. A vertical distortion of the diffraction pattern may indicate a tip. The pattern detector 740 may determine the tilt of the display 145 based on a horizontal spacing between two or more fringes of the detected diffraction pattern and determine the tip of the display based on a vertical spacing between two or more fringes of the detected diffraction pattern.

In some embodiments, the pattern detector 740 determines that the display 145 has a downwards tip (i.e., the normal vector of the display 145 is directed below the horizontal plane) by determining that the vertical distance between subsequent fringes is larger for fringes above the zero order fringe than the vertical distance between subsequent fringes below the zero order fringe. Thus, if $d_2$ corresponds to the vertical axis and if positive values of the vertical order n correspond to fringes above the zero order fringe, then for positive integers n the distance between the fringe of order (m,n) and the fringe of order (m,n+1) is greater than the distance between the fringes of orders (m,−n) and (m,−n−1). Accordingly, if the integers $n_1$ and $n_2$ correspond to the vertical order of fringes in the diffraction pattern, where $n_1 \geq 1$ and $n_2 \geq 0$ and where $n_1 \neq n_2$, then $|\phi_{n_1}-\phi_{n_2}|>|\phi_{-n_1}-\phi_{-n_2}|$ if the positive values of n correspond to fringes above the zero order fringe. Similarly, the pattern detector 740 may determine that the display 145 has an upwards tip (i.e., the normal vector of the display 145 is directed above the horizontal plane) when the vertical distance between subsequent fringes is larger for two fringes below the zero order fringe than the vertical distance between two subsequent fringes above the zero order fringe. The pattern detector 740 may also determine that the tip of the display 145 is correct if the diffraction pattern is horizontally symmetric about the vertical axis that includes the zero order fringe (e.g., if $\phi_n = -\phi_{-n}$).

The process by which the pattern detector 740 determines the tilt of the display 145 may be similar to the process by the pattern detector 740 determines the tip of the display 145. For example, the pattern detector 740 may determine that the display 145 has a tilt to the right (e.g., the normal vector of the display 145 has a positive x-component in the Cartesian coordinate system 370) by determining that the horizontal distance between subsequent fringes is larger for fringes to the right of the zero order fringe than the horizontal distance between subsequent fringes to the left of the zero order fringe. The pattern detector 740 may also determine that the display 145 has a tilt to the left if the horizontal distance between fringes is larger for fringes to the left of the zero order fringe than the horizontal distance between fringes to the right of the zero order fringe.

Because the display 145 may be misaligned over several dimensions (e.g., the display 145 may have a tilt, tip, roll, and position that are all misaligned), the deformation and transformation of the diffraction pattern in a captured image may be a combination of the deformations and transformations described above. Thus, the pattern detector 740 may use the diffraction pattern model $M_D$ to determine the multiple deformations and transforms to which a captured image corresponds.

In some embodiments, in addition to or instead of detecting distortions or transformations of the diffraction pattern, the pattern detector 740 determines the orientation of the display 145 or the optical block 118 based on the relative intensity of each fringe (e.g., the maxima of the intensity at the fringe or the total intensity in the area of the fringe). For example, the pattern detector 740 may determine the tip or tilt of the display 145 based on a comparison of the intensity of the zero order fringe (i.e., the fringe of order (0,0)) to the intensity of another fringe.

The pattern detector 740 may also determine the orientation of the optical block 118 based on the captured image and the diffraction pattern model $M_D$ for a diffraction pattern with the optical block 118. The diffraction pattern model $M_D$ may relate a captured image to the orientation of the optical block 118 to which the captured image corresponds based on the refractive characteristics of the optical block 118.

In some embodiments, the optical block 118 is diffractive in addition to refractive (e.g., if the optical block 118 includes one or more Fresnel lenses). Thus, the diffraction pattern model $M_D$ operating in the display and optical block mode may be based on a diffraction pattern produced by diffraction by both the display 145 and by the optical block 118. In some embodiments, the optical block 118 is aligned before the display 145 is place into the HMD 100 and the diffraction pattern model $M_D$ operating in the optical block only mode is only based on the diffraction pattern produced by the optical block 118. In such an embodiment, if the optical block 118 includes a Fresnel lens, the diffraction pattern may be a series of concentric rings when the lens is properly aligned.

The display controller 750 is an interface that controls the display 145. The display control 750 selectively illuminates individual target pixels 620 or patterns of target pixels 620 on the display 145. In an example embodiment, the display controller 750 illuminates a pixel at the center of the display 145 and one or more pixels at the edge of the display 145.

The pixel location detector 760 determines the spatial locations of pixels illuminated on the display 145 based on one or more captured images. The pixel location detector 760 receive one of more images captured by one or more image capture devices 610, the images capturing the target pixels 620 or patterns illuminated on the display 145 by the display controller 750. The one or more image capture device 610, the display 145, the imaging interface 730, the display controller 750, and the pixel location detector 760 interoperate as an active sensor to determine the orientation of the display 145 and/or the optical block 118.

The location of a target pixel 620 may be determined by the location of the target pixel 620 in an image captured by an image capture device 610, based on the relationship between the position of a pixel in an image capture device 610 and the angular position of the target pixel 620 relative to the image capture device 610. In some embodiments, the pixel location detector 760 also receives focus information (e.g., focal distance) of image capture devices 610 associated with each image. That is, by determining the focal distance of an image capture device 610 that results in the sharpest image of a target pixel 620, the pixel location detector 760 may determine the distance between the image capture device 610 and the target pixel.

The pixel location detector 760 also checks 930 whether the detected pixel locations are correct based on the detected position of each target pixel 620. The pixel location detector 760 may determine whether the x-position and the y-position of the display 145 are properly aligned based on the position of a target pixel 620 at the center or near the center of the display 145. The pixel location detector 760 may also determine a z-position, the tip, the tilt, and the roll of the display 145 based on the relative positions of two or more target pixels 620.

In some embodiments, the pixel location detector 760 determines the horizontal and vertical position of the display 145, e.g., the x and y positions of the display 145 in the Cartesian coordinate system 370. The pattern detector 740 may determine the tip, tilt, and roll of the display 145 and the distance between the display 145 and the detector 330. The pixel location detector 760 and the pattern detector 740 may operate simultaneously or sequentially.

The headset element alignment controller 770 connects to and controls the display alignment device 510 and/or the optical block alignment device 520 to align a headset element (e.g., the display 145 or the optical block 118). The headset element alignment controller 770 includes one or more hardware and software interfaces for communicating with and sending instructions to the display alignment device 510 and/or the optical block alignment device 520.

The headset element alignment controller 770 determines the instructions to send to the display alignment device 510 and/or the optical block alignment device 520 based on the orientation for the headset element determined by the pattern detector 740, the pixel location detector 760, or both.

In some embodiments, the headset element alignment controller 770 controls the display alignment device 510 to align the display 145 based on the display orientation vector $V_D$ determined by the pattern detector 740, the pixel location detector 760, or both. For example, the headset element alignment controller 770 may send instruction to the display alignment device 510 to establish a setpoint based on the difference between the display orientation vector $V_D$ and the target orientation for the display 145. The headset element alignment controller 770 may interoperate iteratively with the pattern detector 740 and/or pixel location detector 760. After the headset element alignment controller 770 rotates and translates the display 145 based on the display orientation vector $V_D$, the pattern detector 740 and/or pixel location detector 760 may re-measure the display orientation vector $V_D$, and the headset element alignment controller 770 may rotate and translate the display 145 based on the new display orientation vector $V_D$.

In some embodiments, the headset element alignment controller 770 determines an adjustment for a headset element based on a previous adjustment and based on a change in the detected orientation of the headset element to which the adjustment corresponds (e.g., the difference between the new display orientation vector $V_D$ and the previous display orientation vector $V_D$). For example, the headset element alignment controller 770 may determine an adjustment to the tilt of a display based on a comparison of a previous adjustment to the tilt of the display and the resultant change to the tilt produced by that adjustment. The headset element alignment controller 770 may determine an adjustment based on a regression of the change in the orientation of the display as a function of a prior adjustment. The regression may be, for example, a linear regression, a quadratic regression, or any other suitable regression.

In some embodiments, the headset element alignment controller 770 may align headset elements with a proportional-summation-difference (PSD) controller. For example, the headset element alignment controller 770 may determine a tilt error $e_{tilt}$ based on the difference between the target tilt and the tilt determined by the pattern detector 740, the pixel location detector 760, or a combination thereof. The headset element alignment controller 770 may control the display alignment device 510 to adjust one or more degrees of freedom (e.g., x, y, z, pitch, yaw, and roll) of the display 145. For example, the headset element alignment controller 770 may adjust the tilt of the display 145 based on a linear combination of a term proportional to the tilt error $e_{tilt}$, a term proportional to the summation (over time) of the tilt error $e_{tilt}$, and a term proportional to the difference of the current tilt error $e_{tilt}$ and a previous value (e.g., the immediately preceding value) of the tilt error $e_{tilt}$.

The headset element alignment controller 770 may also align the optical block 118 using one of the processes for aligning the display 145 described above, mutatis mutandis.

Headset Element Alignment Processes

Figure 8:
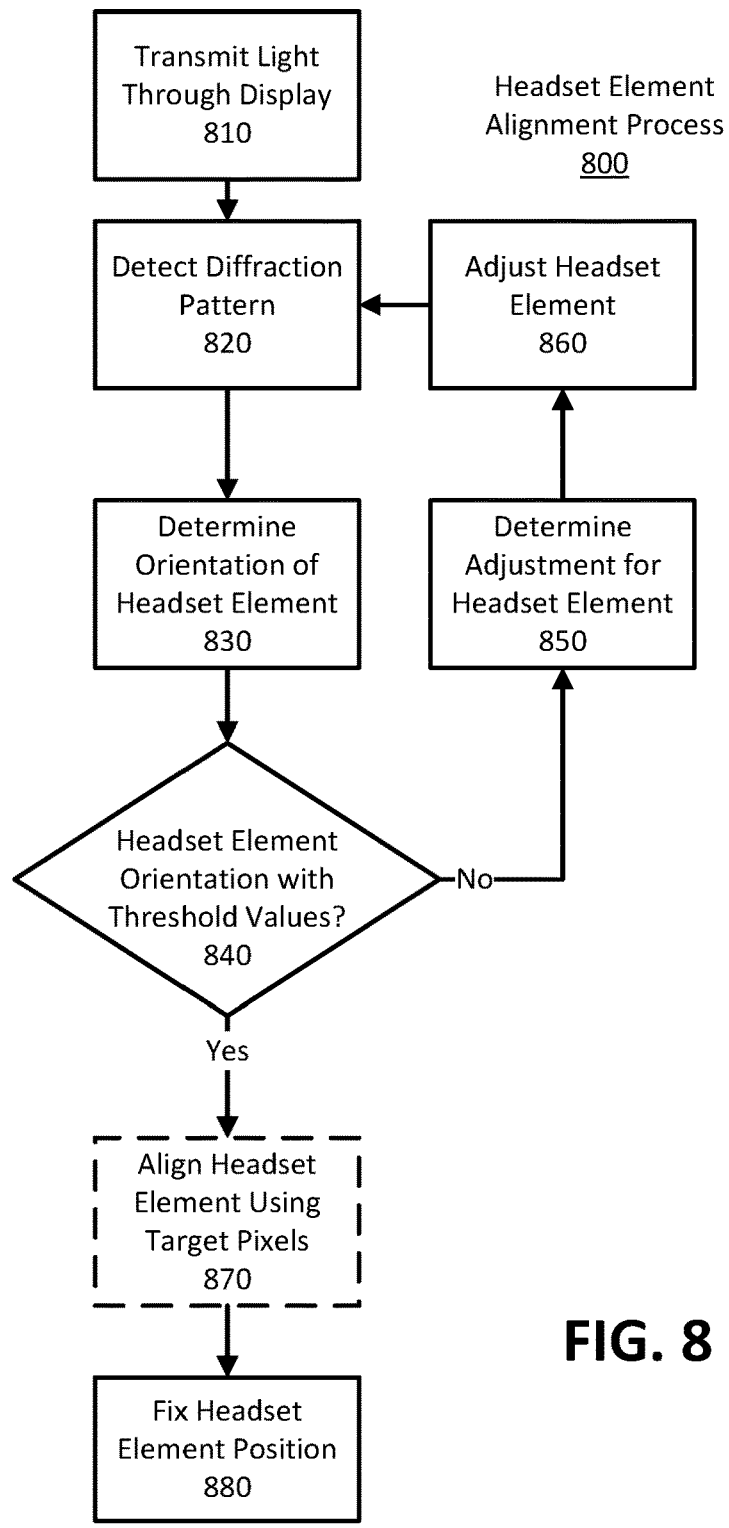
FIG. 8 is a block diagram of a process for aligning a headset element, in accordance with an embodiment.

FIG. 8 is a block diagram of a process for aligning a headset element (e.g., the display 145 or the optical block 118), in accordance with an embodiment. The headset element alignment process 800 may be performed by a headset alignment system (e.g., the headset alignment system 500, the headset alignment system 600). Embodiments may include different and/or additional steps, or perform the steps in different orders.

The headset alignment system transmits 810 coherent light (e.g., the laser beam 320) through a display (e.g., display 145). The coherent light may be produced, for example, by a laser 310 controlled by a laser controller 720. The coherent light may be diffracted by the display to produce a diffraction pattern.

The headset alignment system detects 820 the diffraction pattern by capturing one or more images of the diffraction pattern. The diffraction pattern may be detected by a detector 330 (e.g., a bare image sensor or a detector 330 that is part of an image capture device 610).

The headset alignment system determines 830 the orientation of the headset element (e.g., the display 145 or the optical block 118). Determining 830 the orientation of the headset element may be based on the detected diffraction pattern in an image captured by a detector 330. The pattern detector 740 may determine 830 the orientation of a headset element.

The headset alignment system determines 840 whether the headset element orientation is within threshold values. The headset alignment system compares the current orientation to a target orientation for the headset element. This determination may be performed by an alignment control unit 530. For example, the alignment control unit 530 may check whether a display 145 has a tilt, tip, and/or some other degree of freedom (e.g., x, y, z, and roll) within some bounds about the target orientation (i.e., the display 145 is approximately parallel to the detector 330). The bounds within which orientation of the display 145 is determined to be correct may be based on the geometry of the optical system (e.g., the relative positions of the display 145, the optical block 118, and the exit pupil 150) and optical properties of the optical block 118. The bounds may be selected to assure adequate image quality when the HMD 100 is later used.

If the headset element is not oriented within the threshold values, the headset alignment system determines 850 an adjustment for the headset element. The adjustment may be determined by the headset element alignment controller 770 and may be based on a comparison of the detected orientation of the headset element to the target orientation of the headset element. For example, the headset element alignment controller 770 may determine an adjustment to the tilt of the display 145 based on a comparison of the current tilt determined by the pattern detector 740 to a target tilt for the display 145.

Based on the determined adjustment, the headset alignment system adjusts 860 the headset element. The headset element may be adjusted by the headset element alignment controller 770 by controlling the display alignment device 510 or the optical block alignment device 520. Adjusting the headset element may include adjusting the tip and tilt of the headset element.

If the headset element is determined to be oriented within the threshold values, the headset alignment system may align 870 the headset element using target pixels. An example process for aligning 870 the headset element based on target pixels is further described below in conjunction with FIG. 9. In some embodiments, the step of aligning 870 the headset element with target pixels is omitted from the headset element alignment process 800.

After the headset element is correctly aligned, the headset alignment system may fix 880 the position of the headset element. Fixing 880 the headset element position may be performed by coupling the headset element to the headset body 105 or some other element of the HMD 100. For example, the headset element may be coupled to the headset body 105 by applying an adhesive, by activating an adhesive (e.g., one or more sections of chemically activated or water-activated adhesive or adhesive tape), or via thermal bonding (e.g., welding). Fixing 880 the headset element to the headset body 105 also may include attaching the two components with one or more fasteners, e.g., screws, bolts, nails, or pins.

It is noted that the headset element alignment process 800 is an example of a process for aligning a headset element, and headset elements may be aligned with an alternate processes in some embodiments. For example, aligning 870 the headset element using target pixels may be performed before aligning the headset element based on the diffraction pattern. As another example, the headset element may be aligned 870 using target pixels and adjusted 860 based on a detected diffraction pattern simultaneously.

Figure 9:
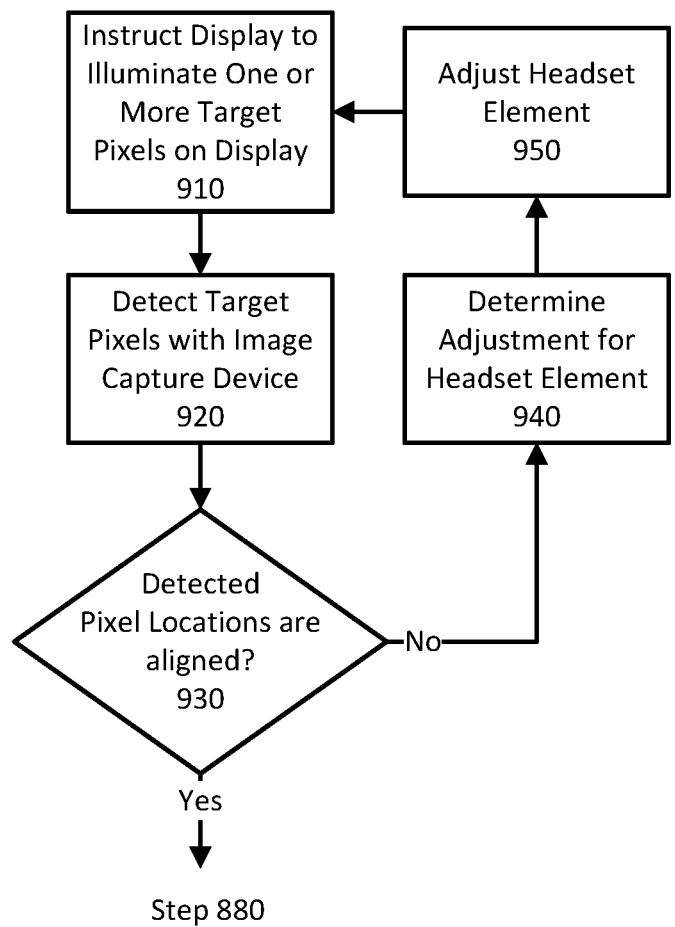
FIG. 9 is a block diagram of a process for aligning a headset element with target pixels, in accordance with an embodiment.

FIG. 9 is a block diagram of a process for aligning 870 a headset element with target pixels, in accordance with an embodiment. Aligning 870 the head element with target pixels may be a subprocess of the headset element alignment process 800 illustrated in FIG. 8. The headset element alignment process 870 may be performed by a headset alignment system (e.g., the headset alignment system 500, the headset alignment system 600). Embodiments may include different and/or additional steps, or perform the steps in different orders.

The headset alignment system (e.g., headset alignment system 600) instructs a display (e.g., display 145) of a HMD under test to illuminate 910 one or more target pixels (e.g., target pixels 620) on the display.

The headset alignment system detects 920 the one or more target pixels with an image capture device (e.g., image capture device 610) by capturing an image of the display (e.g., display 145) or an image of a portion of the display. Capturing the image of the display may include autofocusing the image capture device so that the one or more target pixels or a subset of the one or more target pixels are in focus.

The headset alignment system determines 930 whether the detected pixel locations are aligned. Alignment is based on whether one or more images captured by one or more image capture devices are within a threshold value of predicted pixel positions. For example, for one or more of the target pixels, the headset alignment system may identify pixel pairs by identifying a predicted pixel position that is nearest to a corresponding target pixel and then mapping the two pixels together to create a corresponding pixel pair. The headset alignment system then determines whether the pixel pairs are within a threshold distance from each other (e.g., within one pixel or a fraction of a single pixel).

If the detected target pixel locations are not aligned, the headset alignment system determines 940 an adjustment for the headset element. The adjustment may be determined by the headset alignment controller 770. Determining an adjustment may include estimating the orientation for the headset element based on the locations of the detected target pixels. For example, the headset element alignment controller 770 may determine an adjustment to one or more degrees of freedom (e.g., the x-position) of the display 145 based on a comparison between the current position determined by the pixel location detector 760 and the target position for the display 145.

Based on the determined adjustment, the headset alignment system adjusts 950 the headset element. The headset element may be adjusted by the headset alignment controller 770. The headset element alignment controller 770 may adjust the headset element by controlling the display alignment device 510 and/or the optical block alignment device 520. For example, adjusting 950 the display 145 may include adjusting the position of the display 145 in directions parallel to a surface of the display 145 (e.g., adjusting the y-position and x-position of the display 145).

If the detected target pixel locations are correct, the process of aligning 870 the headset element with target pixels may terminate. The headset alignment system may then proceed to a subsequent step (e.g., fixing 880 the headset element position).

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

The foregoing description of the embodiments of the disclosure has been presented for the purpose of illustration;

it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
    transmitting coherent light through a display of a head-mounted display to produce a diffraction pattern on a detector;
    detecting, with the detector, the diffraction pattern;
    determining a first orientation of the display based in part on the detected diffraction pattern;
    determining an adjustment to the first orientation of the display using the determined first orientation and a target orientation; and
    adjusting the display to a second orientation based on the determined adjustment.

2. The method of claim 1, wherein the first orientation of the display includes a plurality of degrees of freedom of the display, the plurality including at least a tip and a tilt, the tip corresponding to an amount of rotation about a first axis of the display, and the tilt corresponding to an amount of rotation about a second axis of the display that is orthogonal to the first axis.

3. The method of claim 2, wherein determining the first orientation of the display comprises:
    determining the tilt of the display based on a horizontal spacing between two or more fringes of the detected diffraction pattern; and
    determining the tip of the display based on a vertical spacing between two or more fringes of the detected diffraction pattern.

4. The method of claim 1, further comprising determining a position of the display along an axis perpendicular to a surface of the display based on a scaling of the diffraction pattern.

5. The method of claim 1, wherein adjusting the display to the second orientation comprises rotating the display with a display alignment device coupled to the display, and wherein the method further comprises:
    coupling the display alignment device to the display;
    responsive to determining, based on the target orientation, that the display is aligned, fixing the position of the display; and
    decoupling the display alignment device from the display.

6. The method of claim 1, wherein the display includes a cushion sheet, and wherein the coherent light is a laser beam, and wherein the laser beam is incident upon a gap in the cushion sheet.

7. The method of claim 1, further comprising:
    instructing the display to illuminate one of more target pixels on the display;
    capturing, with an image capture device, one or more images of the one or more target pixels;
    determining a first position of the display based on identified locations of the one or more target pixels in the one or more captured images;
    determining a second adjustment to the position of the display using the determined first position of the display; and
    adjusting the display to a second position based on the determined second adjustment.

8. The method of claim 7, wherein adjusting the display to the second orientation based on the determined adjustment includes adjusting a tip and a tilt of the display of a plurality of degrees of freedom of the display, the tip corresponding to an amount of rotation about a first axis of the display, and the tilt corresponding to an amount of rotation about a second axis of the display that is orthogonal to the first axis, and wherein adjusting the display to the second position based on the determined second adjustment includes moving of the display in directions parallel to a surface of the display.

9. The method of claim 1, wherein the display is an organic light-emitting diode (OLED) display.

10. The method of claim 1, wherein diffracted light that radiates from a headset including the display and produces the diffraction pattern is refracted by one or more optical elements of the headset before being detected by the detector.

11. The method of claim 1, wherein diffracted light that radiates from the display and produces the diffraction pattern is directly incident upon the detector without first passing through additional optical elements.

12. The method of claim 1, further comprising:
identifying a zero order fringe in the diffraction pattern;
identifying a second fringe in the diffraction pattern; and
determining the first orientation of the display based on a distance between the zero order fringe and the second fringe.

13. A non-transitory computer-readable storage medium storing executable computer program instructions, wherein the computer program instructions, when executed by a computer processor, cause the computer processor to perform steps comprising:
transmitting coherent light through a display of a head-mounted display to produce a diffraction pattern on a detector;
detecting, with the detector, the diffraction pattern;
determining a first orientation of the display based in part on the detected diffraction pattern;
determining an adjustment to the first orientation of the display using the determined first orientation and a target orientation; and
adjusting the display to a second orientation based on the determined adjustment.

14. The non-transitory computer-readable storage medium of claim 13, wherein determining the first orientation of the display comprises:
determining a tilt of the display based on a horizontal spacing between two or more fringes of the detected diffraction pattern; and
determining a tip of the display based on a vertical spacing between two or more fringes of the detected diffraction pattern, the tip corresponding to an amount of rotation about a first axis of the display.

15. The non-transitory computer-readable storage medium of claim 13, further comprising computer program instructions for determining a position of the display along an axis perpendicular to a surface of the display based on a scaling of the diffraction pattern.

16. The non-transitory computer-readable storage medium of claim 13, wherein adjusting the display to the second orientation comprises rotating the display with a display alignment device coupled to the display, and wherein the steps further comprise:
coupling the display alignment device to the display;
responsive to determining, based on the target orientation, that the display is aligned, fixing the position of the display; and
decoupling the display alignment device from the display.

17. The non-transitory computer-readable storage medium of claim 13, further comprising computer program instructions for:
controlling the display to illuminate one of more target pixels on the display;
capturing, with an image capture device, one or more images of the one or more target pixels;
determining a first position of the display based on identified locations of the one or more target pixels in the one or more captured images;
determining an adjustment to the position of the display using the determined position of the display; and
adjusting the display to a second position based on the determined second adjustment.

18. The non-transitory computer-readable storage medium of claim 17, wherein adjusting the display to the second orientation based on the determined adjustment includes adjusting a tip and a tilt of the display, the tip corresponding to an amount of rotation about a first axis of the display, and the tilt corresponding to an amount of rotation about a second axis of the display that is orthogonal to the first axis, and wherein adjusting the display to the second position based on the determined second adjustment includes moving of the display in directions parallel to a surface of the display.

19. A system comprising:
a laser for transmitting coherent light through a display of a head-mounted display to produce a diffraction pattern;
a detector configured to detect the diffraction pattern;
one or more processors for executing computer instructions that perform steps comprising:
determining a first orientation of the display based in part on the detected diffraction pattern, and
determining an adjustment to the first orientation of the display using the determined first orientation and a target orientation; and
a display alignment device for adjusting the display to a second orientation based on the determined adjustment.

20. The system of claim 19, further comprising:
a display control to control the display to illuminate one or more target pixels on the display;
an image capture device to capture one or more images of the one or more target pixels,
wherein the computer instructions executed by the one or more processors further perform steps comprising:
capturing, with the image capture device, the one or more images of the one or more target pixels,
determining a first position of the display based on identified locations of the one or more target pixels in the one or more captured images,
determining an adjustment to the position of the display using the determined position of the display, and
adjusting the display to a second position based on the determined second adjustment.

* * * * *

UNITED STATES PATENT AND TRADEMARK OFFICE
CERTIFICATE OF CORRECTION

PATENT NO. : 10,310,288 B1
APPLICATION NO. : 15/279161
DATED : June 4, 2019
INVENTOR(S) : Samuel Redmond D'Amico and Evan M. Richards Page 1 of 1

It is certified that error appears in the above-identified patent and that said Letters Patent is hereby corrected as shown below:

In the Claims

Column 20, Line 41, Claim 7, delete "the display to illuminate one of more target pixels" and insert -- the display to illuminate one or more target pixels --.

Column 22, Line 4, Claim 17, delete "the display to illuminate one of more target pixels" and insert -- the display to illuminate one or more target pixels --.

Signed and Sealed this
First Day of October, 2019

Andrei Iancu
*Director of the United States Patent and Trademark Office*